United States Patent [19]
Flaishans et al.

[11] Patent Number: 5,699,857
[45] Date of Patent: Dec. 23, 1997

[54] VEHICLE CLIMATE CONTROL MULTIPLEX SYSTEM

[75] Inventors: Gary B. Flaishans, Clarkston; Robert G. Rudzewicz, Sterling Heights; Michael A. Dahl, Grand Rapids, all of Mich.

[73] Assignee: Chrysler Corporation, Auburn Hills, Mich.

[21] Appl. No.: 579,067

[22] Filed: Dec. 22, 1995

Related U.S. Application Data

[63] Continuation of Ser. No. 156,130, Nov. 22, 1993, abandoned.

[51] Int. Cl.$^6$ .............................. F25B 29/00; H04Q 9/00
[52] U.S. Cl. .............. 165/202; 165/265; 165/42; 165/43; 340/825.78; 340/870.38
[58] Field of Search .................... 340/825.78, 870.38; 165/42, 43, 265, 202

[56] References Cited

U.S. PATENT DOCUMENTS

| | | | |
|---|---|---|---|
| 3,476,881 | 11/1969 | Hensbergen et al. | 340/825.78 |
| 3,743,936 | 7/1973 | Percher | 325/55 |
| 3,872,436 | 3/1975 | Yoshida | 340/825.78 |
| 4,028,620 | 6/1977 | Kitagawa et al. | 340/825.78 |
| 4,320,797 | 3/1982 | Kagohata | 165/12 |
| 4,575,714 | 3/1986 | Rummel | 340/825.78 |
| 4,809,177 | 2/1989 | Windle et al. | 364/424.01 |
| 4,871,011 | 10/1989 | Takahashi et al. | 165/24 |
| 4,884,070 | 11/1989 | Hannaford | 340/825.78 |
| 4,889,179 | 12/1989 | Merenda | 165/14 |
| 4,939,511 | 7/1990 | Hinckley | 340/825.78 |
| 4,994,958 | 2/1991 | Iida | 364/148 |
| 5,146,172 | 9/1992 | Mehr-Ayin et al. | 340/825.78 |
| 5,341,868 | 8/1994 | Nakata | 165/24 |
| 5,461,291 | 10/1995 | Boucheron | 340/825.78 |

FOREIGN PATENT DOCUMENTS

| | | | |
|---|---|---|---|
| 0123520 | 9/1980 | Japan | 165/43 |

*Primary Examiner*—John K. Ford
*Attorney, Agent, or Firm*—Roland A. Fuller, III

[57] ABSTRACT

An automotive heater, ventilation and air conditioning (HVAC) control system reduces overall system cost and improves system reliability by reducing the number of wire interconnects between the climate control head and the multifunction body control module. Wire reduction from as many as seven to as few as one is possible with the inventive resistively multiplex system. The inventive system combines rear defrost, airconditioning on/off and a set of mode door drive motor select signals within a single climate control head. The inventive climate control head includes a series of resistors and switches that effectively allow a vehicle user to select the various modes of HVAG system operation. The climate control head effectively combines the various possible mode signals into one analog signal that varies according to the selected mode. The single analog signal is fed into a single analog-to-digital port in the multifunction control module. The multifunction control module operates on the internally converted digital signals and responsively controls the HVAC system.

5 Claims, 3 Drawing Sheets

VEHICLE CLIMATE CONTROL MULTIPLEX SYSTEM

This application is a continuation of application Ser. No. 08/156,130 filed Nov. 22, 1993, now abandoned.

BACKGROUND OF THE INVENTION

1. Field of the Invention

This invention generally relates to vehicle climate controls used to control heater, ventilation, and air conditioning systems within an automotive vehicle. More specifically, this invention relates to a multiplex scheme that combines various signals required to operate a vehicle climate control system into one analog signal and therefore significantly reduces the number of wire interconnects needed between a climate control head and a multifunction control module.

2. Description of the Prior Art

It is currently recognized that overall system cost can be reduced and overall system reliability can be improved by reducing the number of wiring interconnects within an automobile. Fewer wire interconnects provides improved reliability because there is less hardware required and correspondingly less possibility for part failure. Diagnostics of a system having fewer wire interconnects are improved because there are fewer possibilities of a source of error or malfunction and, therefore, the problem can be diagnosed sooner. Reducing the number of wire interconnects in an automobile control system can also significantly reduce the cost of the system and, therefore, the automobile especially when the reduced number of wire interconnects is achieved concurrent with introducing simpler hardware or less hardware.

Further, reducing the number of wire interconnects in an automobile control system such as a climate control system can reduce the weight of the vehicle and thereby improve such performance factors as fuel efficiency.

Conventional vehicle control systems typically include a multifunction control module. A multifunction control module typically includes a computer that effectively monitors and controls various systems within the automobile to ensure proper automobile performance. Examples include windshield wiper operation and vehicle interior climate control. Conventional vehicle climate control systems include as many as seven wiring interconnects between a climate control head and the multifunction control module. A climate control head is a vehicle operator-accessible device that enables the operator to select from a plurality of modes of operation. For example, a series of push buttons may be provided on the vehicle dashboard with proper indicia to enable the vehicle operator to select from air conditioning modes, including having the air conditioned air directed toward the floor, panel or both levels.

An example of another attempt at reducing the number of wire interconnects in a vehicle climate control system can be found in U.S. Pat. No. 4,320,797. The No. '797 patent discloses a control apparatus for an air conditioner of an automobile that includes apparatus for binary encoding an air conditioning control signal within a climate control head and then decoding the binary signal in a multifunction control module in order to properly control the air conditioning system. The system disclosed in the No. '797 patent is limited to use for an air conditioning signal specifically and is not adaptable to other modes of vehicle climate control. Moreover, the system disclosed in the No. '797 patent introduces additional hardware required to encode and later decode the binary signals used to transmit the air conditioning control information.

This invention provides a substantial improvement over prior attempts at reducing the number of wire interconnects between a climate control head and a multifunction control module within a vehicle climate control system. A system designed in accordance with this invention reduces the number of wire interconnects to as few as one. A single wire interconnect is used, in accordance with this invention, to transmit a single analog control signal between the climate control head and the multifunction control module. The single analog control signal is varied depending on the mode of operation selected. Providing a single wire interconnect substantially improves the system reliability and system diagnostic capability in addition to reducing overall system cost and weight.

SUMMARY OF THE INVENTION

In most general terms this invention includes a selector for selecting from a plurality of climate control modes of operation. The selector has means for producing an analog control signal. The control signal has a selectively variable voltage value indicating the selected mode of operation. A control module is coupled to the selector by a single wire interconnect. The control module has means for receiving the control signal and for producing a set of digital signals that define the selected mode of operation.

In a preferred embodiment the selector includes a voltage divider circuit. The voltage divider circuit includes a plurality of resistors that are selectively engaged by manipulating a switch in the selector. The voltage divider circuit attenuates the voltage value of the analog control signal depending on which resistor is engaged. The voltage value defines the selected mode of operation.

These and other features of this invention will become apparent to those skilled in the art from the following description of the preferred embodiments with the appended drawings, a brief description of which follows.

DETAILED DESCRIPTION OF THE PREFERRED EMBODIMENTS

Figure 1:
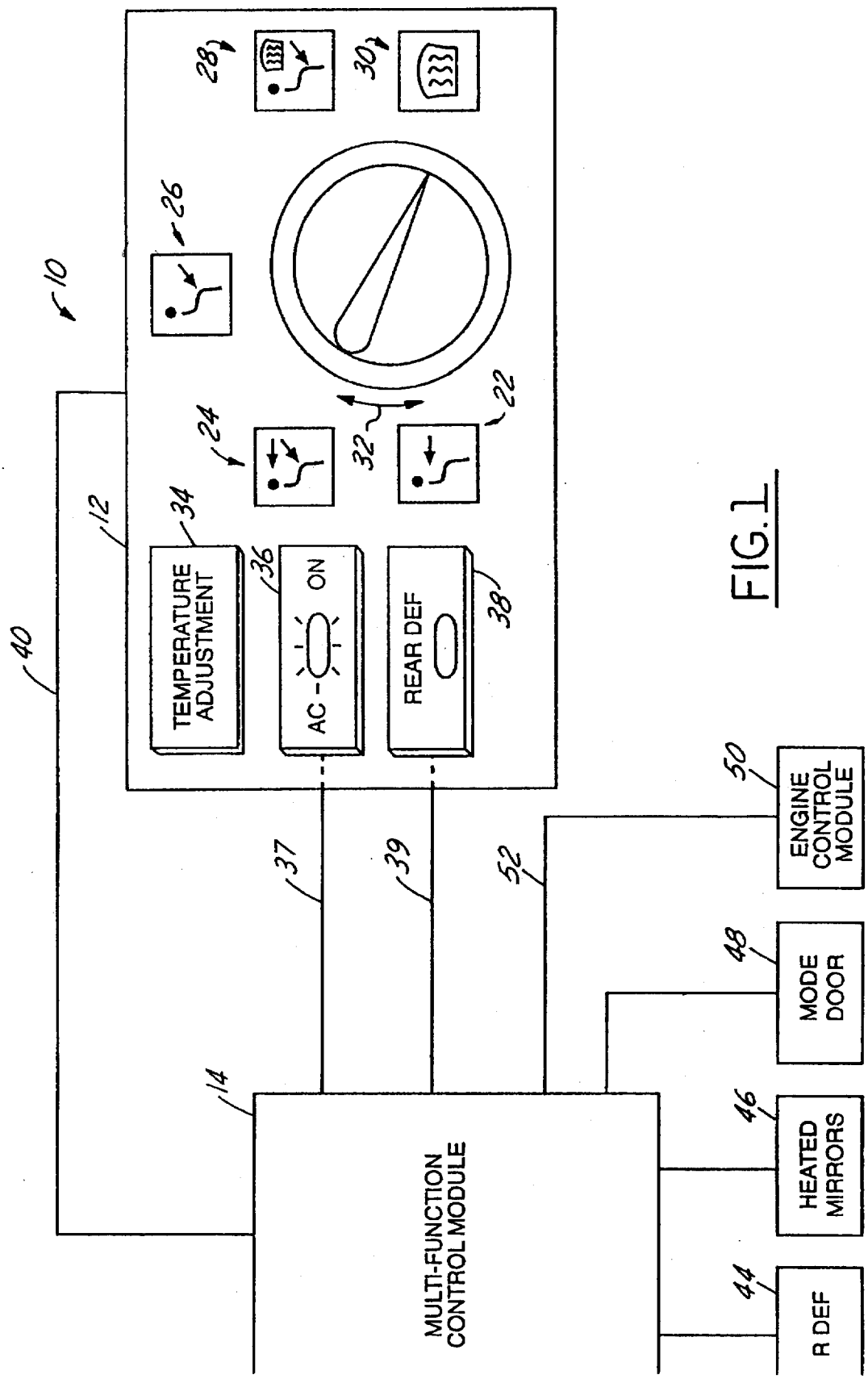
FIG. 1 is a diagrammatic representation of selected elements of a vehicle climate control system showing a climate control head and a multifunction control module in block diagram form.

FIG. 1 diagrammatically illustrates selected portions of vehicle climate control system 10. Climate control system 10 includes climate control head 12 and multifunction control module 14. Climate control head 12 includes selector switch 20 which can be manipulated into various positions in order to provide an indication to multifunction control module 14 of the desired mode of operation of the climate control system. Climate control head 12 includes illustrated indicia showing the various modes of operation. Five modes of air distribution are illustrated including panel 22, bilevel 24, floor 26, mix 28 and defrost 30. Selector switch 20 is rotated as shown by rotation direction arrow 32 in order to choose among one of the five modes of air distribution.

Climate control head 12 also includes conventional temperature adjustment means 34 for adjusting the temperature of the interior of the vehicle. Indicator 36 is provided to indicate when the air conditioning function of the vehicle climate control system is on. In the illustrated embodiment of FIG. 1, indicator 36 communicates with multifunction control module 14 over interconnect 37. Similarly, indicator 38 indicates when a rear defroster is on and indicator 38 communicates with multifunction control module 14 over interconnect 39.

Climate control head 12, in accordance with this invention, communicates with multifunction control module 14 over a single wire interconnect 40. As will be further described below, a single analog control signal is transmitted across interconnect 40 in order to communicate all necessary information from climate control head 12 to multifunction control module 14 to ensure accurate and desired operation of the vehicle climate control system.

Multifunction control module 14 takes the information received from climate control head 12 and outputs a series of digital signals to a plurality of climate control devices on or in the vehicle. Examples of such devices are illustrated in block diagram form in FIG. 1. These devices include rear defroster 44, heated mirrors 46, the mode door air flow control 48 and the engine control module 50. Engine control module 50 is connected to multifunction control module 14 across a serial data link 52. The mode door air flow control 48 is used to direct air within the vehicle according to the function or mode selected using selector switch 20. Engine control module 50, for example, would engage the condenser of the air conditioning unit in order to provide cooled air, for example.

Figure 2:
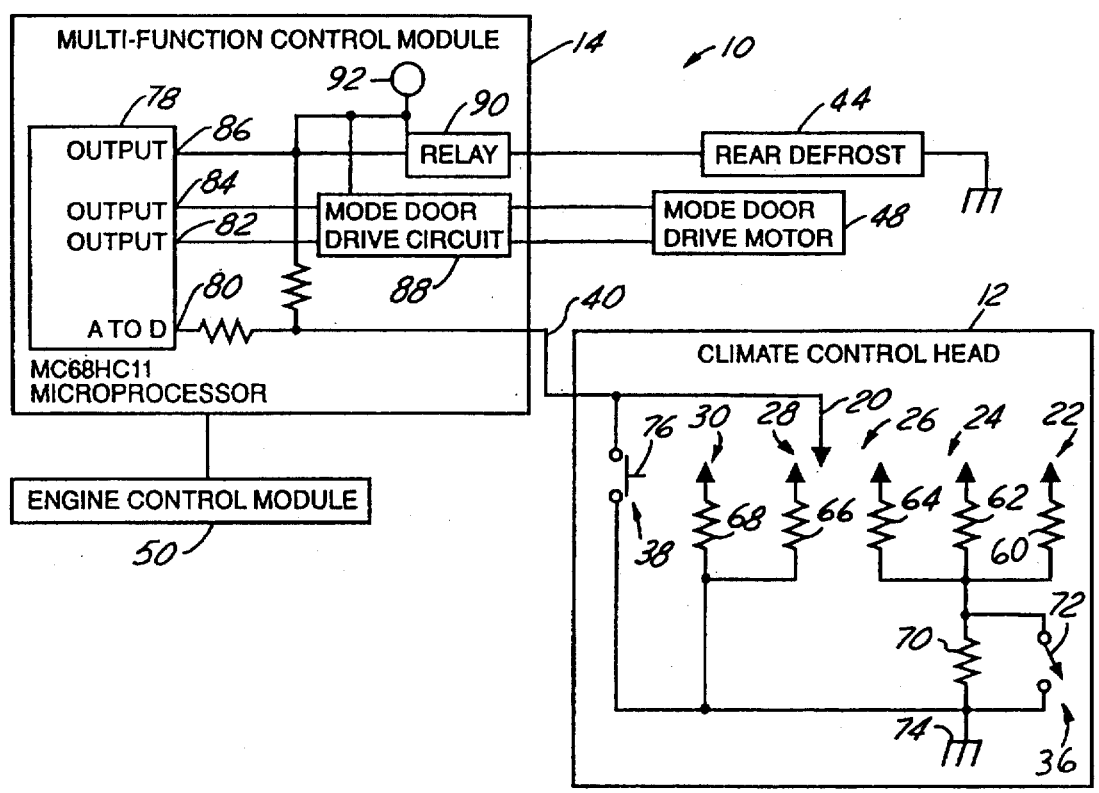
FIG. 2 is an electronic schematic diagram of a climate control head and multifunction control module as implemented in one embodiment of this invention.

FIG. 2 schematically illustrates one embodiment of climate control head 12 and multifunction control module 14. Climate control head 12 includes selector switch 20 which is illustrated in FIG. 2 relative to a series of resistors, each of which corresponds to a position represented by the indicia 22 through 30 of FIG. 1. Resistor 60 corresponds to having the air distribution in what is conventionally known as the panel mode. In the illustrated embodiment, resistor 60 preferably has a resistance value of 47 ohms. Resistor 62 corresponds to the air distribution being in the bilevel mode. Resistor 62 preferably has a resistance value of 78 ohms. Resistor 64 corresponds to the air distribution being in what is conventionally known as the floor mode and the resistance value of resistor 64 is preferably 120 ohms. When selector switch 28 is set to engage resistor 66, the air distribution is in the mix mode and when resistor 68 is engaged the air distribution is in the defrost mode. Resistors 66 and 68 preferably have resistance values of 270 ohms and 330 ohms, respectively. Resistor 70 and switch 72 are used to control whether the air conditioning function of the climate control system is engaged. For example, switch 72 could be thrown by depressing a button associated with indicator 36 of FIG. 1 in order to engage the air conditioning unit within the climate control system. As can be appreciated from the illustration, switch 72 effectively shorts out resistor 70 when it is placed in a closed position. Resistors 60 through 70 are all connected, at one end, to common terminal 74. As can be appreciated from the illustration, the signal coming through single wire interconnect 40 has a voltage amplitude which depends, in part, on the position of selector switch 20 and which of the resistors 60 through 70 are engaged. Resistors 60 through 70 effectively serve as a voltage divider circuit for varying the amplitude of the voltage of the analog signal conducted along single wire interconnect 40.

Normally open switch 76 is provided in the illustrated embodiment for activation of the rear defroster 38. When normally open switch 76 is closed, as can be seen in the drawing, the signal across single wire interconnect 40 is effectively a DC signal equivalent to the voltage of common terminal 74 and when such a signal is received within multifunction control module 14 for a preselected period of time the rear defroster is activated or deactivated depending on the desired operation. Therefore, it is the voltage amplitude in the analog signal across wire interconnect 40 that determines or communicates to multifunction control module 14 the desired function of the vehicle climate control system. Control module 14 will interpret this information as described in more detail below in order to instigate the required functions within the various devices of climate control system 10 that will effect the desired climate within the vehicle.

Control module 14 includes microprocessor 78 which has a single input 80 to receive a signal that comes across the wire interconnect 40. Single input 80 is directly linked to an analog to digital convertor within microprocessor 78. Therefore, input 80 can be referred to as an analog to digital input terminal. Microprocessor 78 also includes a plurality of output terminals including the illustrated terminals 82, 84 and 86. The signals produced within microprocessor 78 that are transmitted across the wire interconnects from output terminals 82 and 84 provide the necessary signals to the mode door drive circuit 88 such that the mode door drive motor 48 is properly activated in order to direct the air flow within the vehicle into the desired direction, for example directing air up toward the windshield in a defrost mode. In the illustrated embodiment, mode door drive circuit 88 interprets signals from microprocessor 78 and produces an output signal that causes mode door drive motor 48 to position the mode door within the vehicle to direct the air into the desired direction. Mode door drive circuit 88 is a conventional circuit capable of interpreting the digital signals produced by microprocessor 78 and for producing a signal that can be interpreted by drive motor 48, the latter also being a conventional apparatus.

Relay 90 is included in multifunction control module 14 in order to provide proper activation of the rear defrost 44. Relay 90 interprets a signal outputted at terminal 86 from microprocessor 78 and relay switch 90 is thrown in order to couple rear defrost device 44 to a power source. Multifunction control module 14 also includes voltage or power source 92 which provides the signals that are used in order to determine which climate control mode the vehicle operator has selected and to power the various devices used for climate control.

Figure 3:
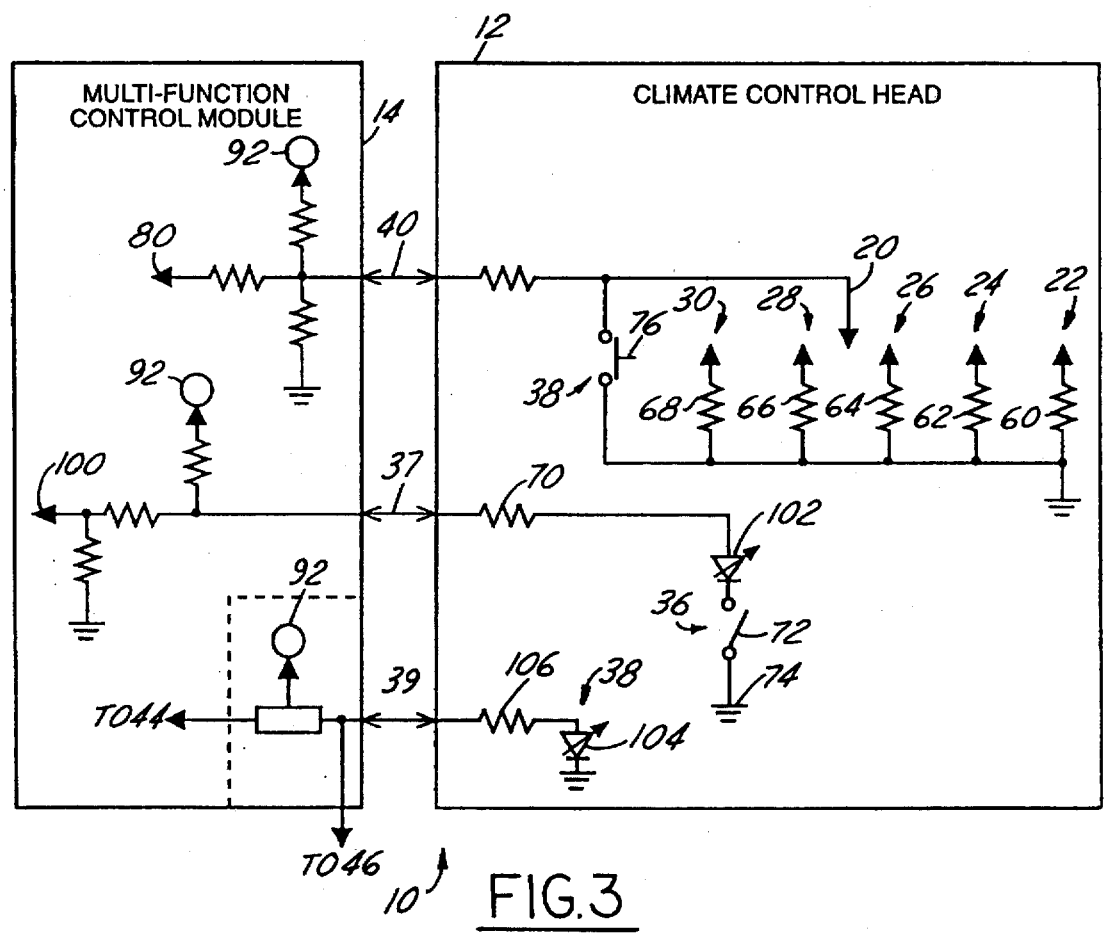
FIG. 3 is an electronic schematic diagram of a climate control head and a multifunction control module as implemented in another embodiment of this invention.

FIG. 3 schematically illustrates another embodiment of this invention. Climate control head 12 is modified relative to the climate control head illustrated in FIG. 2. Specifically, switch 72 and resistor 70 are moved compared to the position illustrated in FIG. 2. Switch 72 and resistor 70 are used in order to control the air conditioning portion of the vehicle climate control system. A single analog input signal is produced at terminal 100 which is received in microprocessor 78 and appropriately interpreted within microprocessor 78 (in a conventional manner) in order to activate or deactivate the air conditioning unit of the vehicle climate control system. Air conditioning LED indicator 102 is provided, for example, on a dashboard within the vehicle in order to indicate to the vehicle operator that the air conditioning unit is on when indicator 102 is lit.

A further addition to the embodiment of FIG. 2 that is illustrated in FIG. 3 exists in the addition of the rear defrost LED indicator 104 and resistor 106. LED indicator 104 is used to indicate to the vehicle operator that the rear defrost apparatus is functioning or activated by multifunction control module 14. It is to be understood, that in FIG. 3, power source 92 is a single source, but for simplicity, is illustrated in three separate locations within FIG. 3 for illustration purposes only.

Referring again now to FIG. 2, the mode of operation of a vehicle climate control system designed in accordance with this invention will be described. A vehicle operator uses selector switch 20 in order to choose the mode of operation for the vehicle climate control system. For example, if the vehicle operator wished to operate the air conditioning in the floor mode, the operator would move selector switch 20 to the right (according to the drawing) in order to engage resistor 64. Resistor 64 in series with resistor 70 effectively divide the voltage value of the signal produced by power source 92 as it is conducted along single wire interconnect 40. The resulting analog signal produced from the attenuation of the signal by resistor 64 and 70 is received at input 80 on microprocessor 78. Microprocessor 78 internally converts the analog signal from climate control head 12 into a series of digital signals in order to activate the appropriate apparatus within vehicle climate control system 10 to achieve the desired operation. The set of digital signals that are produced by microprocessor 78 depends upon the voltage value of the analog signal produced in climate control head 12. Similarly, other resistors provide an analog control signal of a different value indicative of another mode of climate control operation.

Switch 72 is used in order to activate or deactivate the air conditioning unit within the vehicle climate control system. For example, when switch 72 is closed, resistor 70 is effectively shorted out of the circuit when selector switch 20 is set to connect resistors 60, 62 or 64 into engagement with single wire interconnect 40. In one embodiment, closing switch 72 provides a signal that indicates to microprocessor 78 that the air conditioning unit should be activated. Multifunction control module 14, therefore, responsively communicates across serial data link 52 with engine control module 50 which engages the air conditioning unit in a conventional manner when the appropriate signals are produced. It is to be understood that, alternatively, switch 72 could be in an open position in order to indicate that the air conditioning unit should be activated.

Normally open switch 76 is closed in order to effectively produce a signal across single wire interconnect 40 that is essentially equal to the voltage value of common terminal 74. In one embodiment, this value is a ground value. When normally open switch 76 is closed for a preselected period of time and then released the rear defrost is activated. When microprocessor 78 receives the common voltage value across single wire interconnect 40, the therefor output signal is appropriately produced at output terminal 86 in order to activate relay switch 90 which then connects rear defrost 44 to power source 92 thereby activating rear defrost 44. The multifunction control module 14 actuates the rear defroster 44 and provides appropriate timing for it. In one embodiment, as a fail safe provisions the multifunction control module 14 drives the mode door to a desired default position in the event that the rear defrost switch 76 becomes stuck in a closed position.

Referring now to the embodiment of FIG. 3, the mode of operation will be described. Selector switch 20 interacts with resistors 60 through 68 and common terminal 74 in a similar manner to that described in relation to FIG. 2 above. Normally open switch 76 activates the rear defrost in the same manner as described in relation to the embodiment illustrated in FIG. 2. Wire interconnect 37 is provided in the embodiment of FIG. 3 in order to communicate the desired operation of the air conditioning unit from climate control head 12 to multifunction control module 14. Therefore, in the embodiment of FIG. 3, more than the single wire interconnect 40 is provided for communication between multifunction control module 14 and climate control head 12. Switch 72 is coupled to the switch within vehicle climate control system 10 which activates a blower (not shown) in order to distribute air in the desired direction within the vehicle. In a preferred embodiment, air conditioning switch 72 is coupled to the blower switch such that the air conditioning is off whenever the blower is off. Air conditioning switch 72 is preferably coupled with ground terminal 74 but the blower switch is preferably coupled to a separate ground or common terminal. When switch 72 is closed, LED indicator 102 lights up indicating that the air conditioning unit is activated and resistor 70 attenuates the voltage amplitude of the signal produced by power source 92 as it is connected across wire interconnect 37. The analog signal produced at terminal 100 as received by microprocessor 78 instigates the production of the proper output signals for engaging the clutch of the air conditioning unit, for example, by communicating such signals across a serial data link 52 to engine control module 50.

When relay 90 is throe to activate rear defrost 44, for example LED indicator 104 is lit in order to indicate to the vehicle operator that the rear defrost is currently activated. Resistor 106 is provided in order to protect indicator 104. As illustrated in FIG. 3, relay 90 when activated in accordance with the description above can be used to couple rear defrost unit 44 and heated mirrors 46 to a power source in order to remove undesirable condensation or frost from the rear window or rearview mirrors of the vehicle. Otherwise, the function of the embodiment of FIG. 3 parallels the function of the embodiment illustrated in FIG. 2.

A vehicle climate control system designed in accordance with this invention, therefore reduces the overall system cost and improves the reliability of the climate control portion of the automobile. The multiplexing scheme associated with this invention reduces the number of wire interconnects from the climate control head to the multifunction control module from as many as seven wires down to one. The multifunction control module also communicates with the engine control module over the serial data link 52 and controls rear defrost and/or heated mirror operations or other accessories.

A vehicle climate control system designed in accordance with this invention also provides improved system diagnostics.

The preceding description is exemplary rather than limiting in nature. Variations and modifications are possible that do not depart from the purview and spirit of this invention, the scope of which is limited only by the appended claims.

What is claimed is:

1. A vehicle climate control system, comprising:
   a selector for selecting from a plurality of climate control modes of operation, said selector having means for producing an analog control signal, said means including a voltage divider comprising a plurality of discrete resistors, the resistance of each of said resistors defining a selection of a respective mode of air distribution of said plurality of climate control modes of operation such that said analog control signal has a selectively variable voltage value indicating a selected mode of air distribution;
   a control module coupled to said selector by a single wire interconnect between said selector and said control module, said control module having means for receiving said analog control signal and for producing a set of digital signals that define the selected mode of air distribution;

a power source coupled to said selector and said control module, respectively;

said resistors having one of their ends respectively coupled to a common terminal;

said selector further comprising a switch for selectively coupling said power source to said common terminal through one of said resistors, said resistor attenuating the voltage of a signal produced by said power source to thereby produce said analog control signal; and a normally open switch coupled between said power source and said common terminal in parallel with said resistors, said normally open switch being selectively closed to produce a control signal having a constant voltage equal to the voltage value associated with said common terminal.

2. The system of claim 1, further comprising:

a channel for directing airflow within the vehicle; and a motor for selectively positioning said channel in one of a plurality of positions responsively to the selected mode of operation.

3. The system of claim 2, wherein said control module includes means for receiving one signal from said set of digital signals and for driving said motor responsively to said received signal.

4. The system of claim 1, wherein said receiving and producing means comprises a microprocessor having an analog to digital converter for converting said analog control signal into said digital signals.

5. A vehicle climate control system, comprising:

a selector for selecting from a plurality of climate control modes of operation, said selector having means for producing an analog control signal, said means including a voltage divider comprising a plurality of discrete resistors, the resistance of each of said resistors defining a selection of a respective mode of air distribution of said plurality of climate control modes of operation such that said analog control signal has a selectively variable voltage value indicating a selected mode of air distribution;

a control module coupled to said selector by a single wire interconnect between said selector and said control module, said control module having means for receiving said analog control signal and for producing a set of digital signals that define the selected mode of air distribution;

wherein said selectively variable voltage value of said analog control signal further indicates a selected operational mode of at least one of an air conditioning unit or a window defroster unit, said set of digital signal being further operative to control the selected operational mode of said air conditioning unit and said window defroster unit.

* * * * *